US012155112B2

(12) United States Patent
Zheng et al.

(10) Patent No.: US 12,155,112 B2
(45) Date of Patent: *Nov. 26, 2024

(54) MULTIMODE HIGH-ISOLATION ANTENNA SYSTEM

(71) Applicant: Google LLC, Mountain View, CA (US)

(72) Inventors: Ming Zheng, Santa Clara, CA (US); Peter Joseph Bevelacqua, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/222,684

(22) Filed: Jul. 17, 2023

(65) Prior Publication Data

US 2023/0361448 A1 Nov. 9, 2023

Related U.S. Application Data

(63) Continuation of application No. 17/743,600, filed on May 13, 2022, now Pat. No. 11,749,876, which is a continuation of application No. 16/924,622, filed on Jul. 9, 2020, now Pat. No. 11,335,990.

(60) Provisional application No. 62/908,269, filed on Sep. 30, 2019.

(51) Int. Cl.
*H01Q 1/22* (2006.01)
*H01Q 1/24* (2006.01)
*H01Q 5/22* (2015.01)
*H01Q 9/04* (2006.01)

(52) U.S. Cl.
CPC ........... *H01Q 1/2283* (2013.01); *H01Q 1/243* (2013.01); *H01Q 5/22* (2015.01); *H01Q 9/0421* (2013.01)

(58) Field of Classification Search
CPC ........ H01Q 9/0421; H01Q 1/243; H01Q 5/22; H01Q 1/2283
See application file for complete search history.

(56) References Cited

FOREIGN PATENT DOCUMENTS

CN 111682303 A * 9/2020 ............... H01Q 1/36

* cited by examiner

*Primary Examiner* — Graham P Smith
(74) *Attorney, Agent, or Firm* — Kilpatrick Townsend & Stockton LLP

(57) ABSTRACT

This document describes a multimode high-isolation antenna system and associated methods and systems. The described antenna system is implemented on a generally-circular printed circuit board and can be used for wideband and ultra-wideband applications. The multimode high-isolation antenna system includes two orthogonal antennas separated by a decoupling structure. This arrangement provides high isolation between the antennas and enables five unique resonant modes of operation for the multimode high-isolation antenna system.

19 Claims, 12 Drawing Sheets

MULTIMODE HIGH-ISOLATION ANTENNA SYSTEM

CROSS-REFERENCE TO RELATED APPLICATIONS

This application is a continuation of U.S. patent application Ser. No. 17/743,600, filed May 13, 2022, which is a continuation of U.S. patent application Ser. No. 16/924,622, filed Jul. 9, 2020, which claims the benefit of U.S. Provisional Patent Application No. 62/908,269, filed Sep. 30, 2019, each of which is hereby incorporated by reference herein it its entirety.

BACKGROUND

In some electronic devices, an antenna system using multiple antennas may be implemented for wireless communication. However, isolation between the multiple antennas may be limited by the surrounding hardware of the electronic device, particularly for low-band frequencies. Antenna isolation is a measure of a ratio between the power incident upon a first antenna and the power delivered to a second antenna. Good isolation, therefore, results in uncorrelated transmission and reception of electric signals on both antennas. Poor isolation between antennas can significantly reduce Multiple-Input and Multiple-Output (MIMO) system performance and the efficiency of the antennas. Further, in some instances, low isolation can result in intermodulation that causes certification failure due to an out-of-band spurious emission.

SUMMARY

This document describes a multiband high-isolation antenna system and associated techniques and systems. The described antenna system may be implemented on a generally-circular printed circuit board and can be used for wideband and ultra-wideband applications. The multimode high-isolation antenna system may include two substantially orthogonal antennas separated by a decoupling structure. This arrangement may provide high isolation between the antennas and enable five unique resonant modes of operation for the multimode high-isolation antenna system. In addition, the two antennas may have high radiation performance and complementary radiation patterns, which may be essential for superior multiple-input multiple-output (MIMO) and diversity performance.

According to an aspect, there is provided a multimode antenna system. The multimode antenna system may include a generally-circular printed circuit board, a first antenna connected to the printed circuit board, and a second antenna connected to the printed circuit board. The second antenna may be approximately 90 degrees out of phase from the first antenna. The multimode antenna system may also include a decoupling structure connected to the printed circuit board at a location between the first antenna and the second antenna.

The multimode antenna system may include the following optional features. At least one of the first antenna or the second antenna may include an inverted-F antenna, a first loop structure aligned with the inverted-F antenna, and a second loop structure positioned adjacent to the inverted-F antenna. The second loop structure and the inverted-F antenna may share a connection point to the printed circuit board. The inverted-F antenna may include a post connected to the printed circuit board and extending, in relation to a center point or mass center of the printed circuit board, radially outward from the generally-circular printed circuit board. The inverted-F antenna may include an arm having an arc that extends along a circumferential line concentric with an outer circumference of the PCB, in particular the arm may be concentric with the printed circuit board. The first loop structure may be positioned between the printed circuit board and the arm of the inverted-F antenna. The arm of the inverted-F antenna may have a length within a range of approximately 16 millimeters to approximately 18 millimeters. The second loop structure may include an additional post connected to the printed circuit board and extending radially outward from the printed circuit board. The second loop structure may include a crossbeam connected to the post of the inverted-F antenna and having an arc that is concentric with the printed circuit board. The inverted-F antenna may have an arm with an open end that is positioned within a range of approximately 4 millimeters to approximately 6 millimeters distal from the printed circuit board. The decoupling structure may include a T-element with a center post and two arms that are substantially coplanar with the printed circuit board. One of the two arms of the T-element may radially overlap a portion of the second loop structure. Each arm of the T-element may have a length within a range of approximately 12 millimeters to approximately 14 millimeters.

The multimode antenna system may also include the following optional features. At least one of the first antenna or the second antenna may include an inverted-F antenna operable as a quarter-wavelength monopole at a first low-band frequency and a three-quarter-wavelength monopole at a first high-band frequency, a first loop structure operable as a half-wavelength folded monopole at a second high-band frequency, and a second loop structure operable as a half-wavelength folded monopole at a third high-band frequency. The decoupling structure may include a T-element operable as a quarter-wavelength monopole at a second low-band frequency in combination with the inverted-F structure operating as the quarter-wavelength monopole at the second low-band frequency. The multimode antenna system may also include a touch sensor positioned proximate to the at least one of the first and second antennas. The touch sensor may be operable to conduct current while the first loop structure operates as the half-wavelength folded monopole at the first high-band frequency. The first low-band frequency may be approximately 2.4 GHZ, the second low-band frequency may be approximately 2.73 GHZ, the first high-band frequency may be approximately 5.85 GHZ, the second high-band frequency may be approximately 5.15 GHZ, and the third high-band frequency may be approximately 7.6 GHz. The printed circuit board may be coplanar with each of the first antenna, the second antenna, and the decoupling structure. The decoupling structure may be approximately 45 degrees out of phase with each of the first and second antennas. The first and second antennas in combination with the decoupling structure may be operable in multiple resonant modes between approximately 2 GHz and approximately 8 GHz.

According to another aspect, there is provided an electronic device that may include the multimode antenna system as described above.

This summary is provided to introduce simplified concepts concerning a multiband high-isolation antenna system, which is further described below in the Detailed Description and Drawings. This summary is not intended to identify essential features of the claimed subject matter, nor is it intended for use in determining the scope of the claimed subject matter.

BRIEF DESCRIPTION OF THE DRAWINGS

The details of one or more aspects of a multiband high-isolation antenna system are described in this document with reference to the following drawings. The same numbers are used throughout the drawings to reference like features and components.

DETAILED DESCRIPTION

Overview

Using multiple antennas in an electronic device can result in poor isolation between the antennas due to their proximity in terms of signal wavelength. Poor isolation corresponds to poor antenna efficiency. This document describes a multiband high-isolation antenna system and associated techniques and systems. This multiband high-isolation antenna system has high isolation (e.g., larger than 20 decibels (dB)) between multiple antennas at multiple bands (e.g., 2.4 GHz and 5 GHz bands). The antenna has a decoupling structure between two adjacent antennas to reduce the amount of current that runs from one antenna to the other antenna, in particular at particular frequencies, which increases the isolation between the antennas for those frequencies.

In aspects, a multimode antenna is disclosed. The multimode antenna comprises a generally-circular printed circuit board, a first antenna connected to the printed circuit board, and a second antenna connected to the printed circuit board. The second antenna is approximately ninety degrees out of phase from the first antenna. In addition, the multimode antenna includes a decoupling structure connected to the printed circuit board at a location between the first antenna and the second antenna.

In aspects, an electronic device is disclosed. The electronic device comprises a generally-spheroidal housing, a generally-circular printed circuit board (PCB) positioned within the housing, a speaker assembly positioned within the housing, and two antennas connected to the PCB. The two antennas are approximately ninety degrees out of phase from one another. In addition, the electronic device includes a decoupling structure positioned between the two antennas.

These are but a few examples of how the described techniques and devices may be used to enable a multimode high-isolation antenna system. Other examples and implementations are described throughout this document. The document now turns to an example device, after which example systems are described.

Example Device

Figure 1:
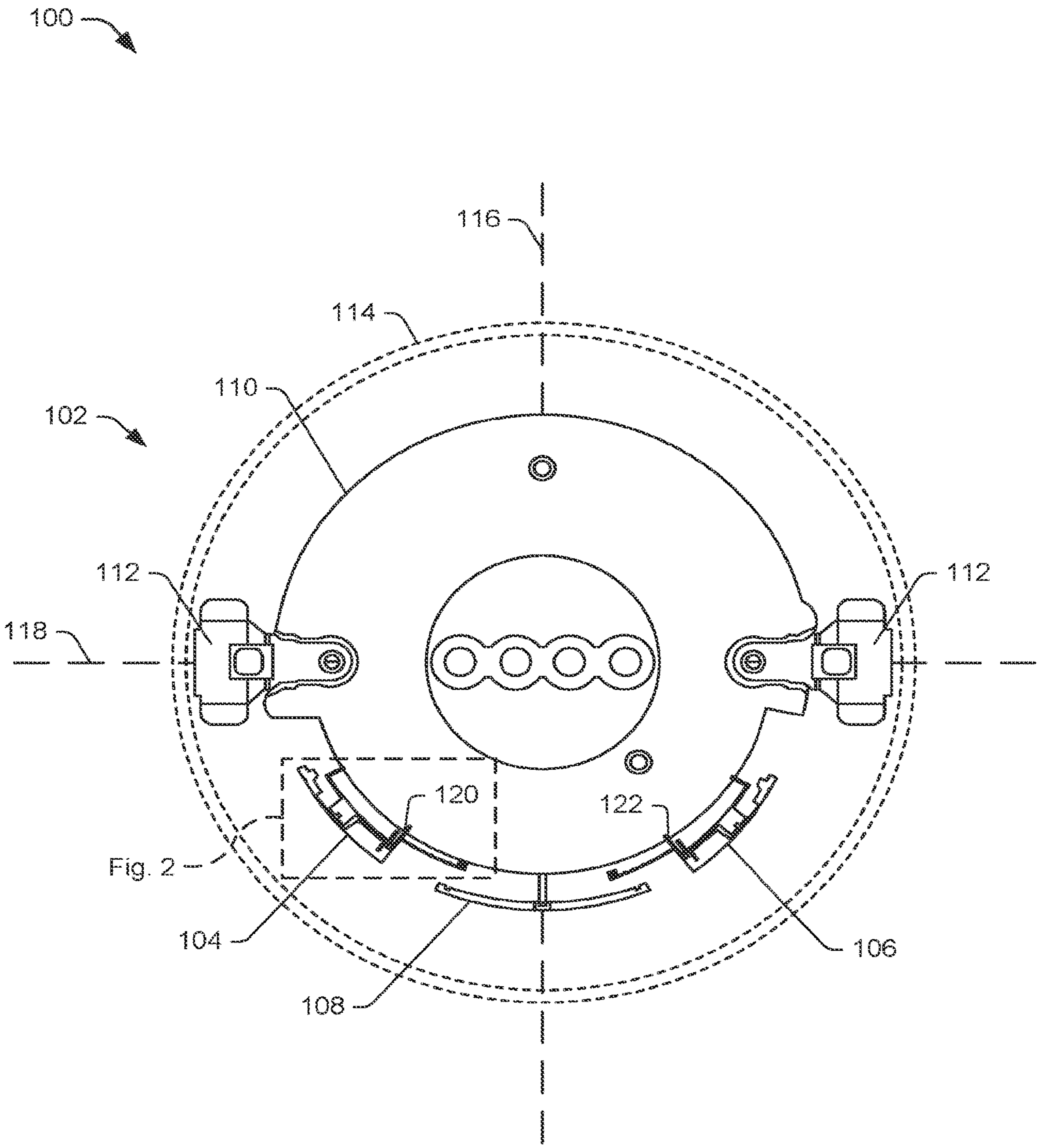
FIG. 1 illustrates a top plan view of an example implementation of a multimode high-isolation antenna system.

FIG. 1 illustrates a top plan view 100 of an example implementation of a multimode high-isolation antenna system 102. The multimode high-isolation antenna system 102 includes a first antenna 104, a second antenna 106, and a decoupling structure 108, each connected to a printed circuit board (PCB) 110. Consequently, the multimode high-isolation antenna system 102 may be referred to as a PCB antenna. In addition, one or more touch sensors 112 may be attached to the PCB 110 at locations proximate to the first antenna 104 and/or the second antenna 106. As is further described below, the multimode high-isolation antenna system 102 may be positioned within a housing 114 of an electronic device.

The PCB 110 has a circular or generally-circular (or oval) shape with a portion removed to provide a space for the first antenna 104, the second antenna 106, and the decoupling structure 108. The PCB 110 may be defined with first and second axes that are perpendicular to each other and define a plane in which the PCB 110 extends. The first axis may correspond to a vertical axis 116 and the second axis may correspond to a horizontal axis 118. In aspects, the touch sensors 112 include two touch sensors that are positioned across from each other on opposing sides of the first axis (e.g., the vertical axis 116) of the PCB 110 and along the second axis (e.g., the horizontal axis 118) of the PCB 110.

As illustrated, the first antenna 104 is approximately 90 degrees out of phase with the second antenna 106, such that the two antennas are substantially orthogonal. This offset provides complimentary coverage and helps to provide pattern diversity and high isolation at high band. The second antenna 106 may have substantially the same structure as the first antenna 104 and be positioned symmetrically about the vertical axis 116. Alternatively, the second antenna 106 may have a different structure than the first antenna 104. The decoupling structure 108 increases the isolation between the first antenna 104 and the second antenna 106. The position of the decoupling structure 108 in combination with optimizing the positions of the first and second antennas 104 and 106 significantly increases the isolation between the antennas.

The decoupling structure 108 is positioned between the first antenna 104 and the second antenna 106 such that the decoupling structure 108 is approximately 45 degrees out of phase with each of the first and second antennas 104 and 106. Consequently, the first antenna 104, the second antenna 106, and the decoupling structure 108 are positioned, as a group, on one half of the PCB 110. The decoupling structure 108 is a T-element (e.g., T-monopole) with a center post 120 and two arms 122 that are coplanar with the PCB 110. In aspects, each arm 122 of the T-element has a length within a range of approximately 12 millimeters to approximately 14 millimeters. At least one of the two arms 122 of the T-element may radially overlap a portion of the first antenna 104 or a portion of the second antenna 106. The center post 120 extends, in relation to a center point or mass center of the PCB 110, radially outward from the PCB 110. The arms 122 forms an arc that extends along a circumferential line concentric with an outer circumference of the PCB 110, in particular each of the arms 122 may be concentric with the PCB 110.

By including the decoupling structure 108 between the antennas 104 and 106, the isolation between the antennas 104 and 106 is significantly increased because the decoupling structure 108 blocks a substantial amount of the current that attempts to run from one antenna to the other antenna. The current, at certain frequencies, runs in the decoupling structure 108 instead of the other antenna, which enables more resonant frequency ranges to be used by the antenna system than is usable by conventional antenna systems that do not have the decoupling structure 108.

As is further described below with respect to FIG. 3, the multimode high-isolation antenna system 102 has a first radio terminal 124 (e.g., Port 1) used to deliver power to the first antenna 104 from a power source (not shown). In addition, the multimode high-isolation antenna system 102 has a second radio terminal 126 (e.g., Port 2) used to deliver power to the second antenna 106 from a power source (not shown).

Figure 2:
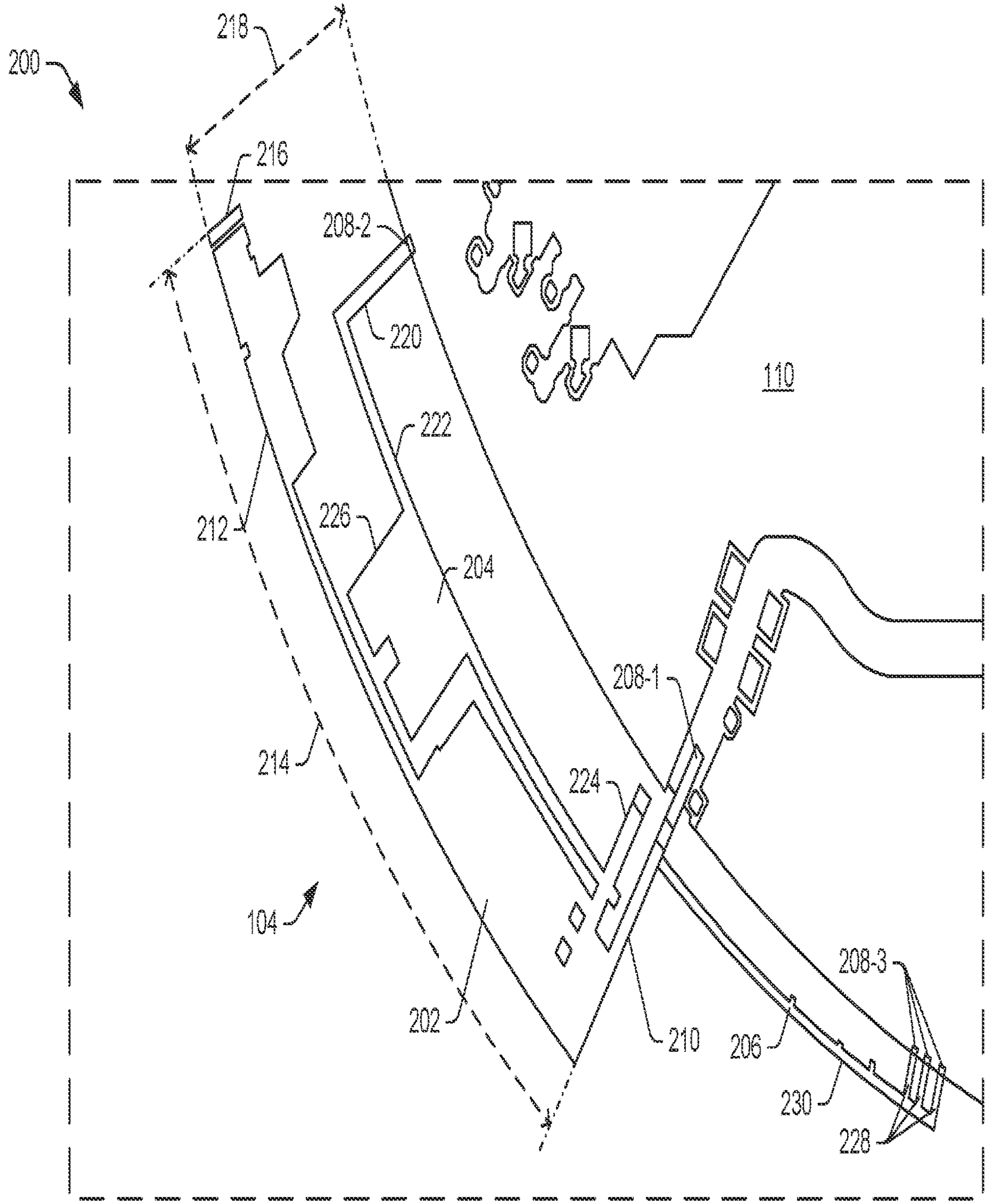
FIG. 2 illustrates an enlarged view of a portion of the top plan view of FIG. 1, showing a first antenna of the multimode high-isolation antenna system.

FIG. 2 illustrates an enlarged view 200 of a portion of the top plan view 100 of FIG. 1, showing the first antenna 104 of the multimode high-isolation antenna system 102. The first antenna 104 has an inverted-F antenna (IFA) structure 202, a first loop structure 204, and a second loop structure 206. As illustrated, the first antenna 104 is connected to the PCB 110 at multiple connection points 208-1, 208-2, 208-3. Any arrangement of suitable connection point(s) 208 may be used to attach the first antenna 104 to the PCB 110. Further, the inverted-F antenna may be replaced with an inverted-L antenna (ILA) structure to achieve similar functionality and performance.

The first loop structure 204 is substantially aligned with the inverted-F antenna 202. For example, the first loop structure 204 is positioned between the inverted-F antenna 202 and the PCB 110. The second loop structure 206 is positioned adjacent to the inverted-F antenna 202. In aspects, the second loop structure 206 and the inverted-F antenna 202 share a common connection point 208-1 to the PCB 110. Further, as illustrated in FIG. 1, the inverted-F antenna 202 radially overlaps a portion of the second loop structure 206.

The inverted-F antenna 202 has a post 210 and an arm 212. The post 210 extends, in relation to a center point or mass center of the PCB 110, radially outward from the PCB 110. The arm 212 is an arc that extends along a circumferential line concentric with an outer circumference of the PCB 110, in particular the arm 212 may be concentric with the PCB 110. The post 210 connects to the PCB 110. In aspects, the arm 212 has a length a 214 that is within a range of approximately 16 millimeters (mm) to approximately 18 mm. One example length a 214 of the arm 212, from the post 210 to an open end 216 of the arm 212, is approximately 17 mm. In addition, the open end 216 of the arm 212 is positioned distal from the PCB 110 by a distance b 218 that is within a range of approximately 4 mm to approximately 6 mm. One example distance b 218 between the open end 216 of the arm 212 and the PCB 110 is approximately 5 mm.

The first loop structure 204 includes a post 220, which extends, in relation to a center point or mass center of the PCB 110, radially outward from the PCB 110, and a crossbeam 222, which is an arc that extends along a circumferential line concentric with an outer circumference of the PCB 110, in particular the crossbeam 222 may be concentric with the PCB 110. The crossbeam 222 connects to the post 220 and a second post 224 of the inverted-F antenna 202 to form the loop the first loop structure 204. In addition, the crossbeam 222 includes a member 226 that extends radially outward from the crossbeam 222 such that the member 226 is positioned between the crossbeam 222 and the arm 212 of the inverted-F antenna 202. The second loop structure 206 includes one or more posts 228 connected to the PCB 110 at connection point(s) 208-3 and a crossbeam 230. The one or more posts 228 extend, in relation to a center point or mass center of the PCB 110, radially outward from the PCB 110. The crossbeam 230 is connected to the one or more posts 228 and is an arc that extends along a circumferential line concentric with an outer circumference of the PCB 110, in particular the crossbeam 230 may be concentric with the PCB 110. The crossbeam 230 also connects to the post 210 of the inverted-F antenna 202 to form the loop of the second loop structure 206.

Figure 3:
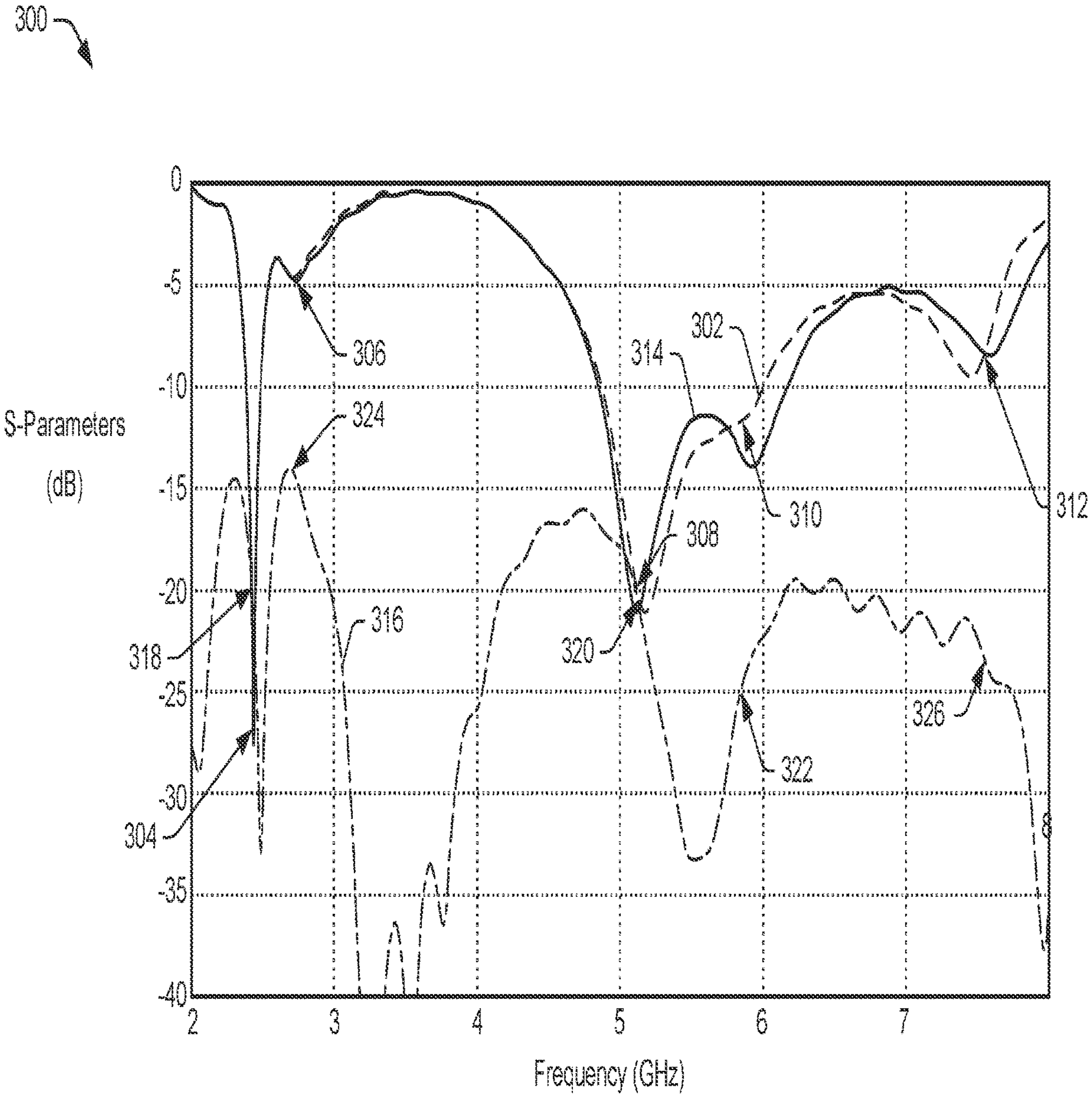
FIG. 3 is a plot of a curve representing S-parameters corresponding to power reflected by the first antenna of the multimode high-isolation antenna system in FIG. 1 over a range of frequencies from approximately 2 GHz to approximately 8 GHz.

FIG. 3 is a plot 300 of a curve 302 representing S-parameters corresponding to power reflected by the first antenna 104 of the multimode high-isolation antenna system in FIG. 1 over a range of frequencies from approximately 2 GHz to approximately 8 GHz. S-parameters describe the input-output relationship between terminals in an electrical system. Consider an example device using two radios (radio-1 and radio-2) that deliver power to two antennas (antenna-1 and antenna-2) via two radio terminals (terminal-1 and terminal-2), respectively. Parameter S11 refers to reflected power (also referred to as a reflection coefficient) that radio-1 is attempting to deliver to antenna-1. Parameter S22 refers to reflected power that radio-2 is attempting to deliver to antenna-2. Parameter S12 represents a transmission coefficient, which corresponds to the power from radio-2 that is delivered through antenna-1 to radio-1. Parameter S21 represents the transmission coefficient corresponding to the power from radio-1 that is delivered through antenna-2 to radio-2. In general, S-parameters are a function of frequency.

In the illustrated plot 300, the curve 302 represents the S11 parameter, indicating an amount of power reflected by the first antenna 104 (at the first radio terminal 124) between frequencies of approximately 2 GHz to approximately 8 GHz. At point 304, the S-parameter at low-band frequencies around approximately 2.4 GHz is below-27 dB, indicating significantly low power loss through reflection. At point 306, the S11 at low-band frequencies around approximately 2.73 GHz is around −5 dB. At point 308, the S11 at high-band frequencies around approximately 5.15 GHz is below −20 dB. At point 310, the S11 at high-band frequencies around approximately 5.85 GHz is approximately −14 dB. At point 312, S11 at high-band frequencies around approximately 7.6 GHz is approximately −8 dB. The curve 314 represents the S22 parameter, indicating an amount of power reflected by the second antenna 106 (at the second radio terminal 126). The curve 314 exhibits similar behavior to the S11 parameter (the curve 302) of the first antenna 104.

The multimode high-isolation antenna system 102 can operate on five unique resonant modes to cover each of the above-described frequencies. For example, the multimode high-isolation antenna system 102 uses ¼ wavelength (λ) and a ¾ λ (IFA or ILA) to cover 2.4 GHz and 5.8 GHz, respectively. The multimode high-isolation antenna system 102 uses a ½ λ folded monopole for the first loop structure 204 in FIG. 2 to cover 5.15 GHz. The multimode high-isolation antenna system 102 uses a ½ λ folded monopole for the second loop structure 206 to cover 7.6 GHz. The multimode high-isolation antenna system 102 uses a ¼ λ monopole mode for the decoupling structure 108 (e.g., T-monopole) of FIG. 1 to reduce coupling between the first antenna 104 and the second antenna 106. Each of these modes is further described with respect to FIGS. 4-8.

Curve 316 represents the S21 parameter, indicating the amount of isolation between the first antenna 104 and the second antenna 106. The S12 parameter matches the S21 parameter and can therefore also be represented by the curve 316. The multimode high-isolation antenna system 102 has high isolation (e.g., S21 is less than −20 dB) at both 2.4 GHz and 5.15 GHz frequencies, as illustrated at points 318 and 320, respectively. At point 322, the isolation at 5.85 GHz is also high (e.g., S21 is less than −25 dB). Further, the isolation at 2.73 GHz and 7.6 GHz is high (e.g., S21 is less than −14 dB), as illustrated at points 324 and 326, respectively. Accordingly, the multimode high-isolation antenna system 102 can radiate wideband and also has the potential for ultra-wideband (e.g., 6 GHz to 8 GHZ). Further, the multimode high-isolation antenna system 102 may use a switched diversity scheme to switch between the first and second antennas 104, 106 for different frequencies being used simultaneously. For example, using the switched diversity scheme, the electronic device 102 can determine the receive signal with the most energy and switch to the corresponding antenna. The switch can occur dynamically. Alternatively, the switch can occur upon install, such that when the electronic device 102 is installed on a network, the electronic device selects the antenna that has a better connection to a router for a particular frequency.

Figure 4:
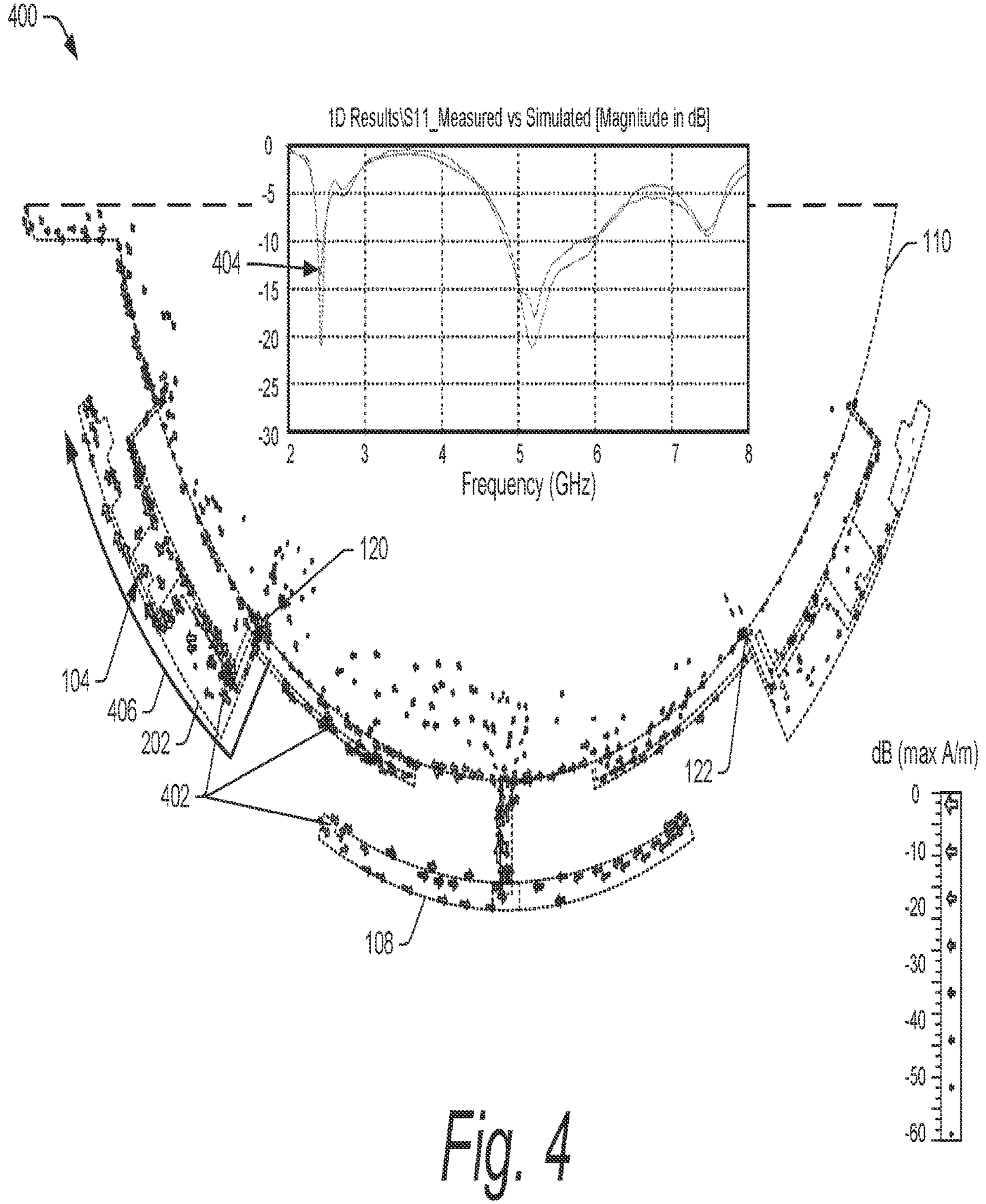
FIG. 4 illustrates an example diagram showing current flow in the multimode high-isolation antenna system at approximately 2.44 GHz with a first radio terminal excited, and a plot of the corresponding S11 parameter.

FIG. 4 illustrates an example diagram 400 showing current flow in the multimode high-isolation antenna system at approximately 2.44 GHz with the first radio terminal 124 excited, and a plot of the corresponding S11 parameter. The direction of arrows 402 in the diagram indicates the direction of current flowing through the multimode high-isolation antenna system 102 from FIG. 1 at approximately 2.44 GHz (indicated by 404). A curve 406 shows how the antenna works at a quarter-wavelength (λ) monopole mode as the current is maximized at the terminal and minimized at the element's open end without its direction changed. The size of each arrow 402 indicates an amount of the current flowing at that location. Here, the first antenna 104 is operating on a quarter-wavelength (λ) monopole mode, using the inverted-F antenna 202 (as indicated by the curve 406). Alternatively, the first antenna 104 can use an inverted-L antenna in the ¼ λ monopole mode. The decoupling structure 108 provides extra current, which reduces the amount of current excited at the second radio terminal 126. The decoupling structure 108 is reactive and helps block current from passing from one antenna to the other, which increases the isolation of each antenna.

Figure 5:
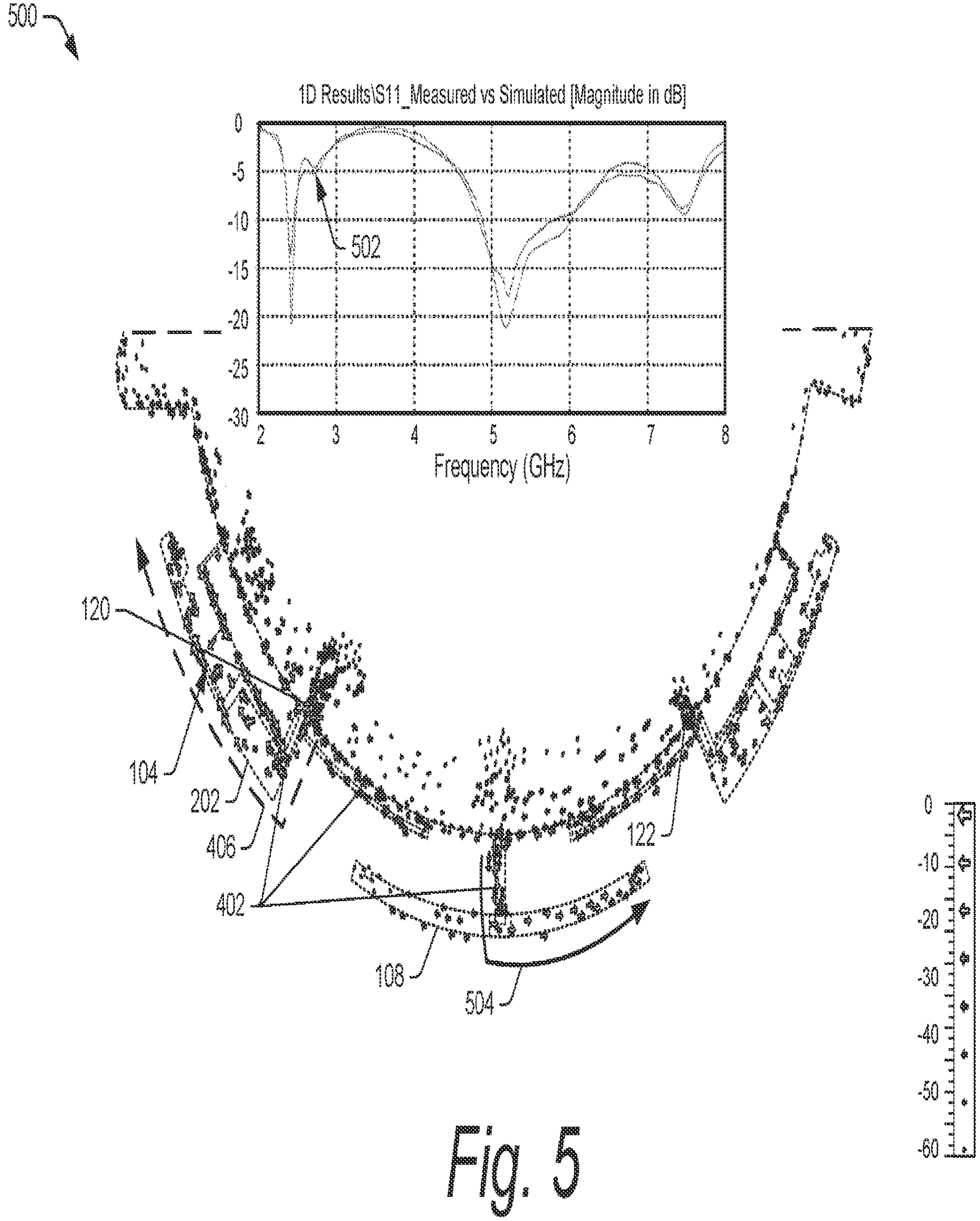
FIG. 5 illustrates an example diagram showing current flow in the multimode high-isolation antenna system at approximately 2.73 GHz with the first radio terminal excited, and a plot of the corresponding S11 parameter.

FIG. 5 illustrates an example diagram 500 showing current flow in the multimode high-isolation antenna system 102 at approximately 2.73 GHz (as indicated by 502) with the first radio terminal 124 excited, and a plot of the corresponding S11 parameter. Here, the first antenna 104 is operating at a ¼ λ monopole mode, using the inverted-F antenna 202 (as indicated by the curve 406) and the decoupling structure 108 is also operating at a ¼ λ monopole mode (as indicated by arrow 504). The combination of the two modes provides the decoupling effect with regard to the second radio terminal 126. This frequency may be used for certain applications where a wide operating bandwidth is required.

Figure 6:
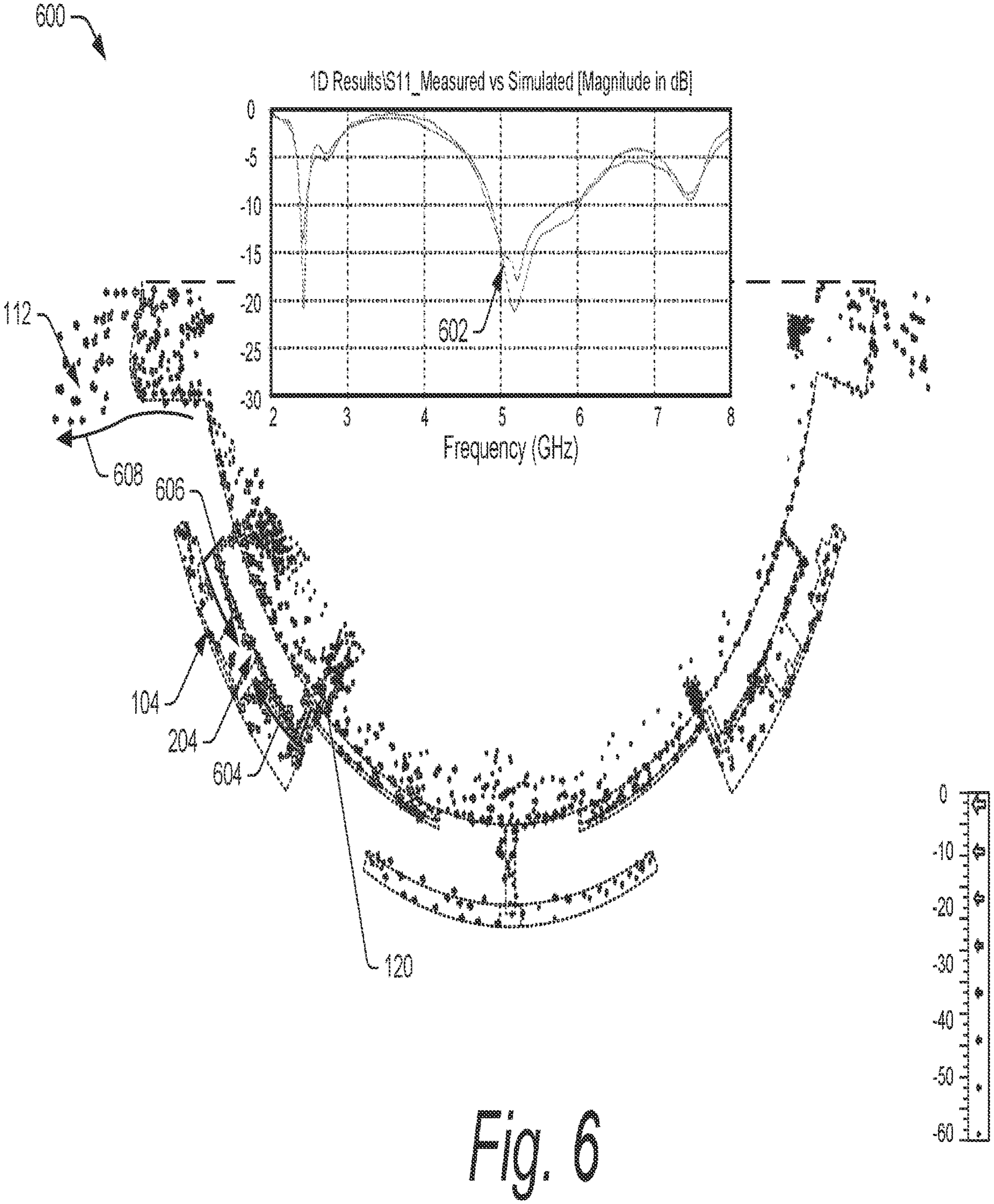
FIG. 6 illustrates an example diagram showing current flow in the multimode high-isolation antenna system at approximately 5.15 GHz with the first radio terminal excited, and a plot of the corresponding S11 parameter.

FIG. 6 illustrates an example diagram 600 showing current flow in the multimode high-isolation antenna system 102 at approximately 5.15 GHz (as indicated by 602) with the first radio terminal 124 excited, and a plot of the corresponding S11 parameter. Here, the first antenna 104 is using the first loop structure 204 to operate as a ½ λ folded monopole. Alternatively, the first loop structure 204 may operate on a one λ loop mode if a ground connection is included. Arrows 604 and 606 each indicate a ¼ λ of the ½ λ folded monopole. It is noted that some current runs in the touch sensor 112 such that the touch sensor 112 helps to increase the isolation between the antennas.

Figure 7:
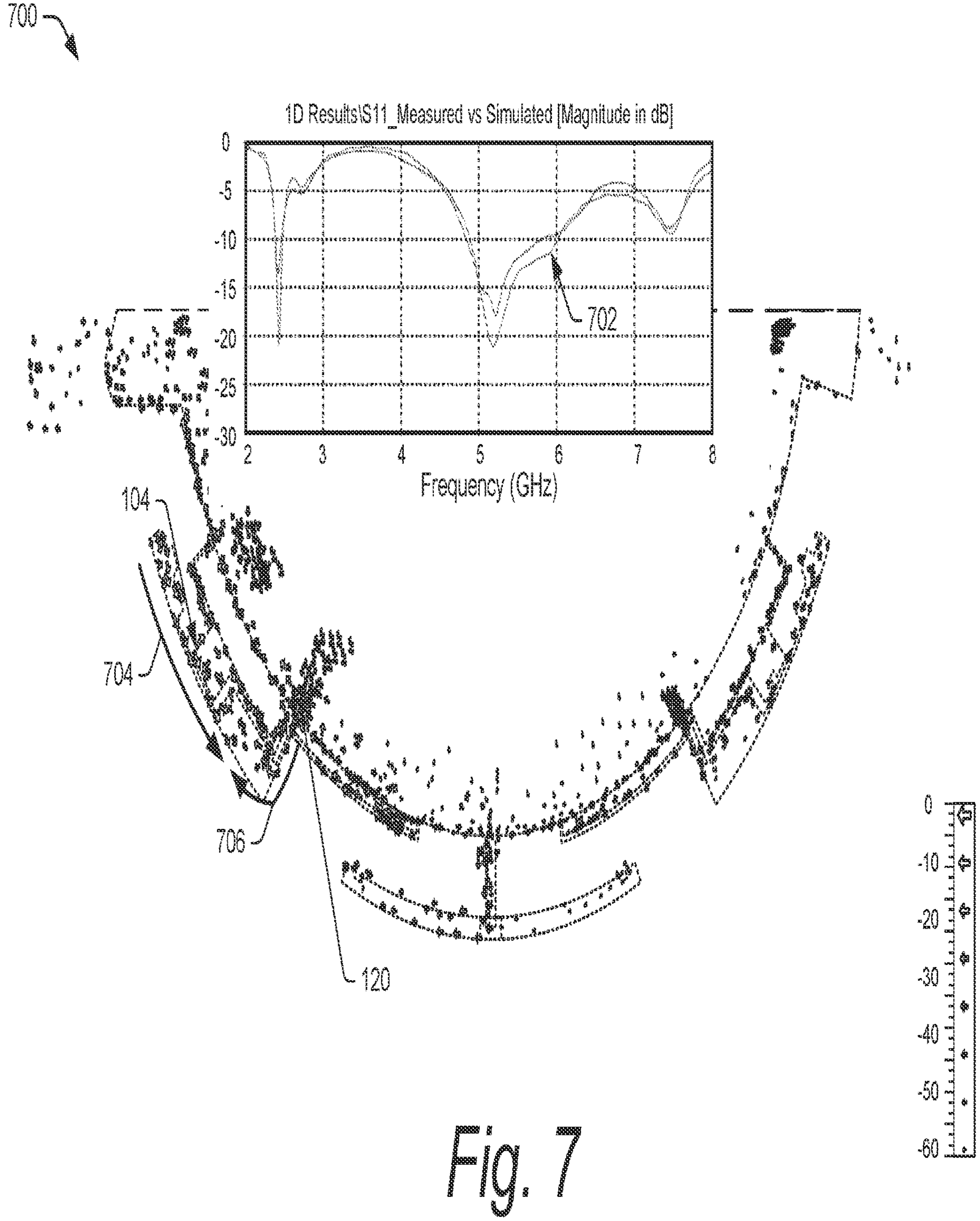
FIG. 7 illustrates an example diagram showing current flow in the multimode high-isolation antenna system at approximately 5.85 GHz with the first radio terminal excited, and a plot of the corresponding S11 parameter.

FIG. 7 illustrates an example diagram 700 showing current flow in the multimode high-isolation antenna system 102 at approximately 5.85 GHz (as indicated by 702) with the first radio terminal 124 excited, and a plot of the corresponding S11 parameter. Here, the first antenna 104 is operating as a ¾ λ monopole. For example, arrow 704 represents a ½ λ (similar to a dipole) and arrow 706 represents a ¼ λ (similar to a monopole). These work together to operate as the ¾ λ monopole at 5.85 GHz. Accordingly, the third harmonic is used to generate extra resonance, which broadens the bandwidth.

Figure 8:
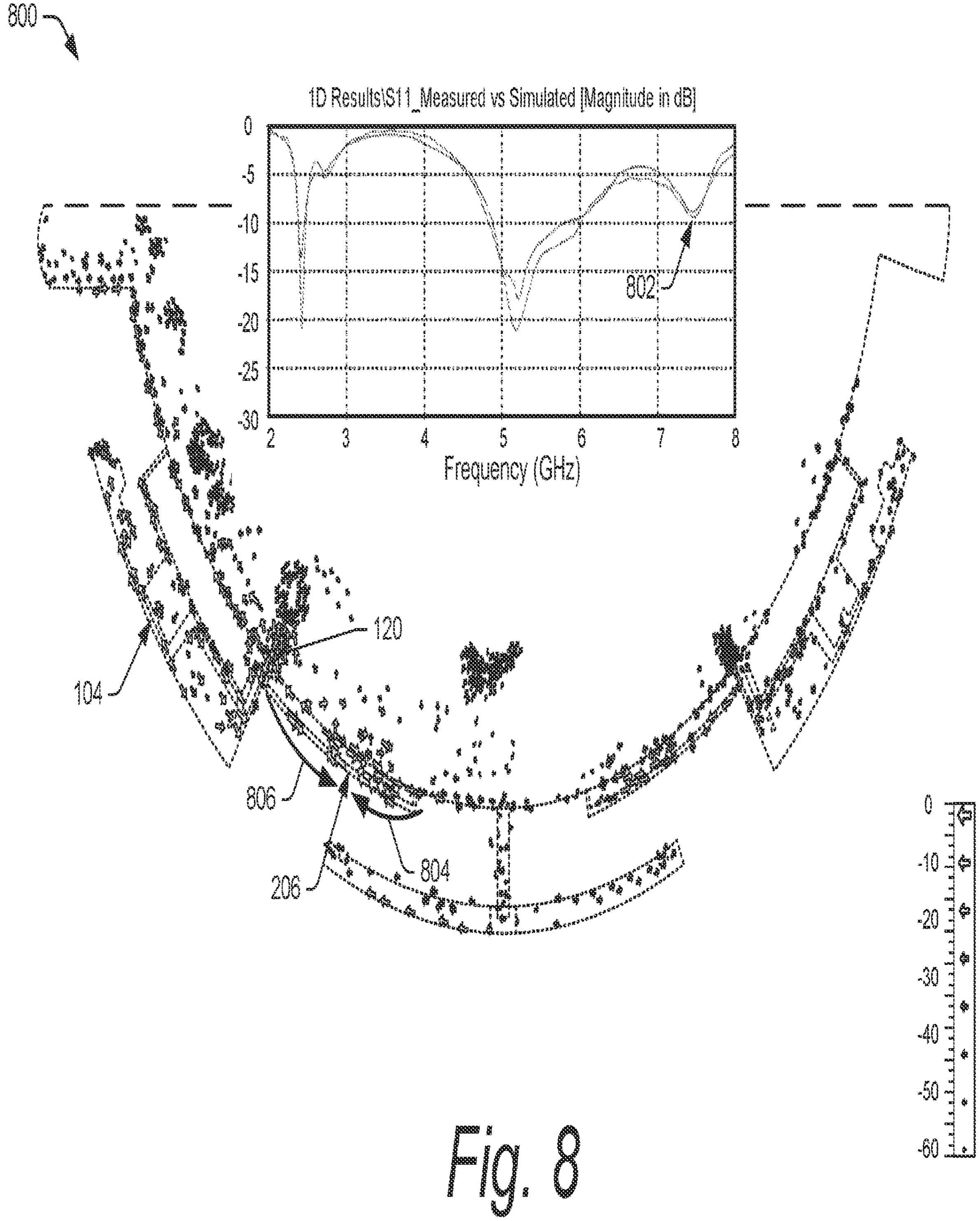
FIG. 8 illustrates an example diagram showing current flow in the multimode high-isolation antenna system at approximately 7.6 GHz with the first radio terminal excited, and a plot of the corresponding S11 parameter.

FIG. 8 illustrates an example diagram 800 showing current flow in the multimode high-isolation antenna system 102 at approximately 7.6 GHz (as indicated by 802) with the first radio terminal 124 excited, and a plot of the corresponding S11 parameter. Here, the second loop structure 206 of the first antenna 104 acts as a shunt inductor. The second loop structure 206 is operating as a ½ λ folded monopole. Arrows 804 and 806 each represent a ¼ λ of the ½ λ folded monopole. The second loop structure 206 acts as both a matching element and a radiation element.

Figure 9:
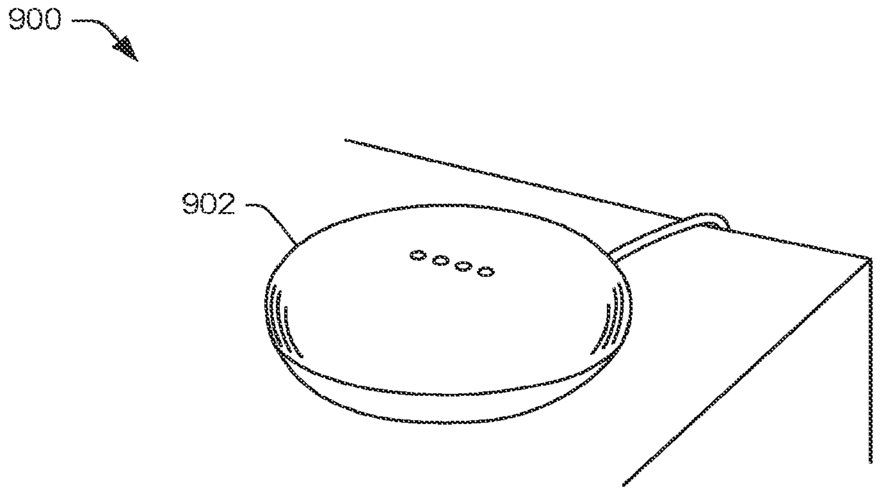
FIG. 9 illustrates a front perspective view and a top plan view of an example electronic device that implements the multimode high-isolation antenna system.
Figure 9:
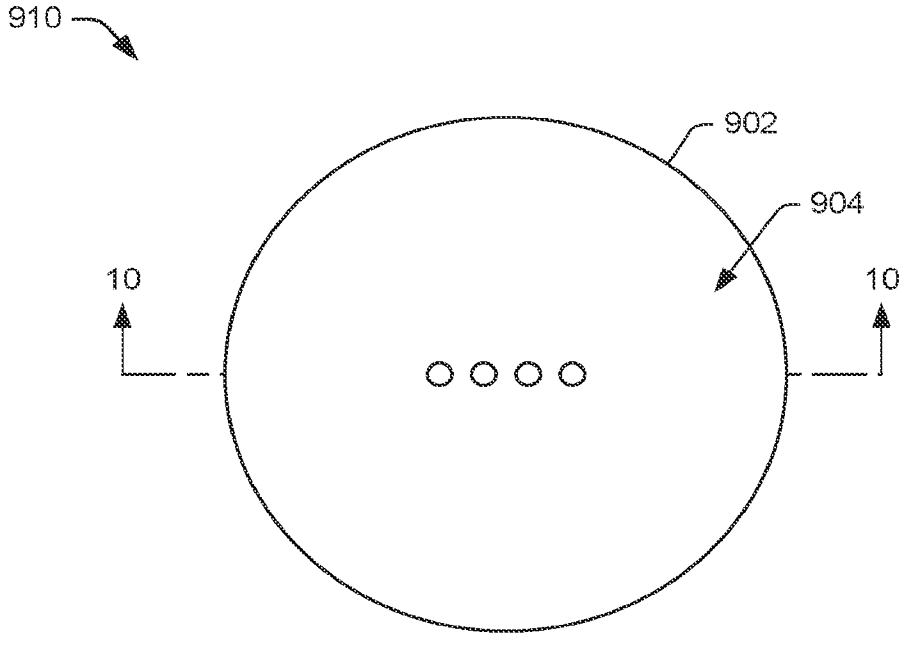

FIG. 9 illustrates a front perspective view 900 and a top plan view 910 of an example electronic device 902 that implements the multimode high-isolation antenna system. As further described below, the electronic device 902 may be an electronic device that can connect to a wireless network. The electronic device 902 is compact and generally spheroidal. The electronic device 902 has an oblate spheroid housing 904 having a planar base, such that an x-axis radius of the housing 904 is within approximately a ten-millimeter tolerance of a y-axis radius of the housing 904. The top plan view 910 includes a section line 10-10, which corresponds to the section view in FIG. 10.

Figure 10:
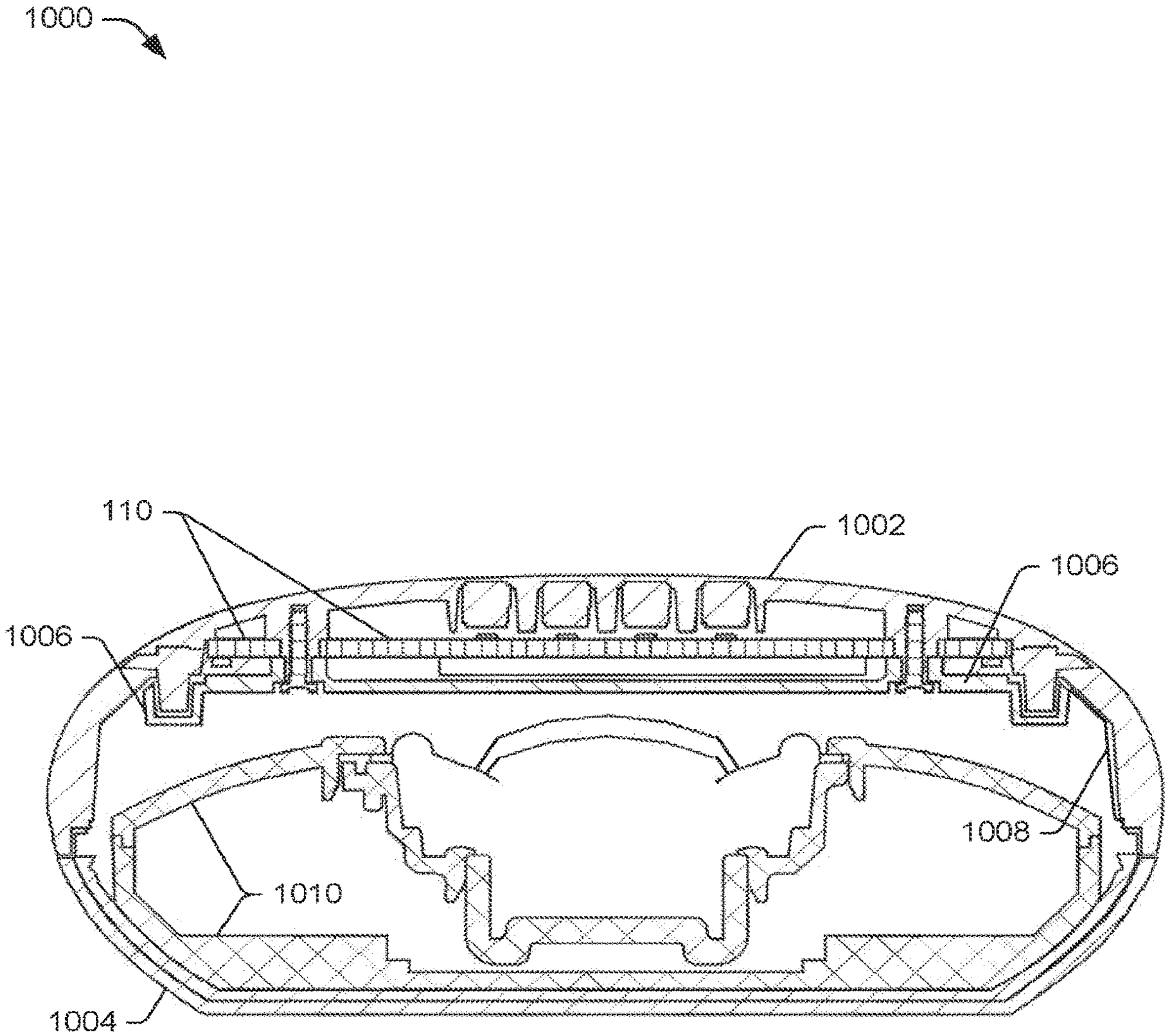
FIG. 10 illustrates a sectional view of the electronic device of FIG. 9, taken along section line 10-10 and at the horizontal sectioning plane.

FIG. 10 illustrates a sectional view 1000 of the electronic device of FIG. 9, taken in the direction indicated by section line 10-10 and at the horizontal sectioning plane. In this sectional view 1000, the electronic device 902 includes various hardware components within the housing 904 in a compact assembly. For example, the electronic device 902 includes a top cover 1002, a bottom cover 1004, the PCB 110 (including the multimode high-isolation antenna system 102), a heat sink 1006, touch sensors 1008, and a speaker 1010. The multimode high-isolation antenna system 102 is positioned proximate to, and abuts, the top cover 1002 and is between the top cover 1002 and the heat sink 1006. The speaker 1010 is positioned within the housing adjacent to the bottom cover 1004. In some aspects, a graphite sheet (not shown) may be positioned below the PCB 110 and the heat sink 1006 may be plastic.

Example Computing System

Figure 11:
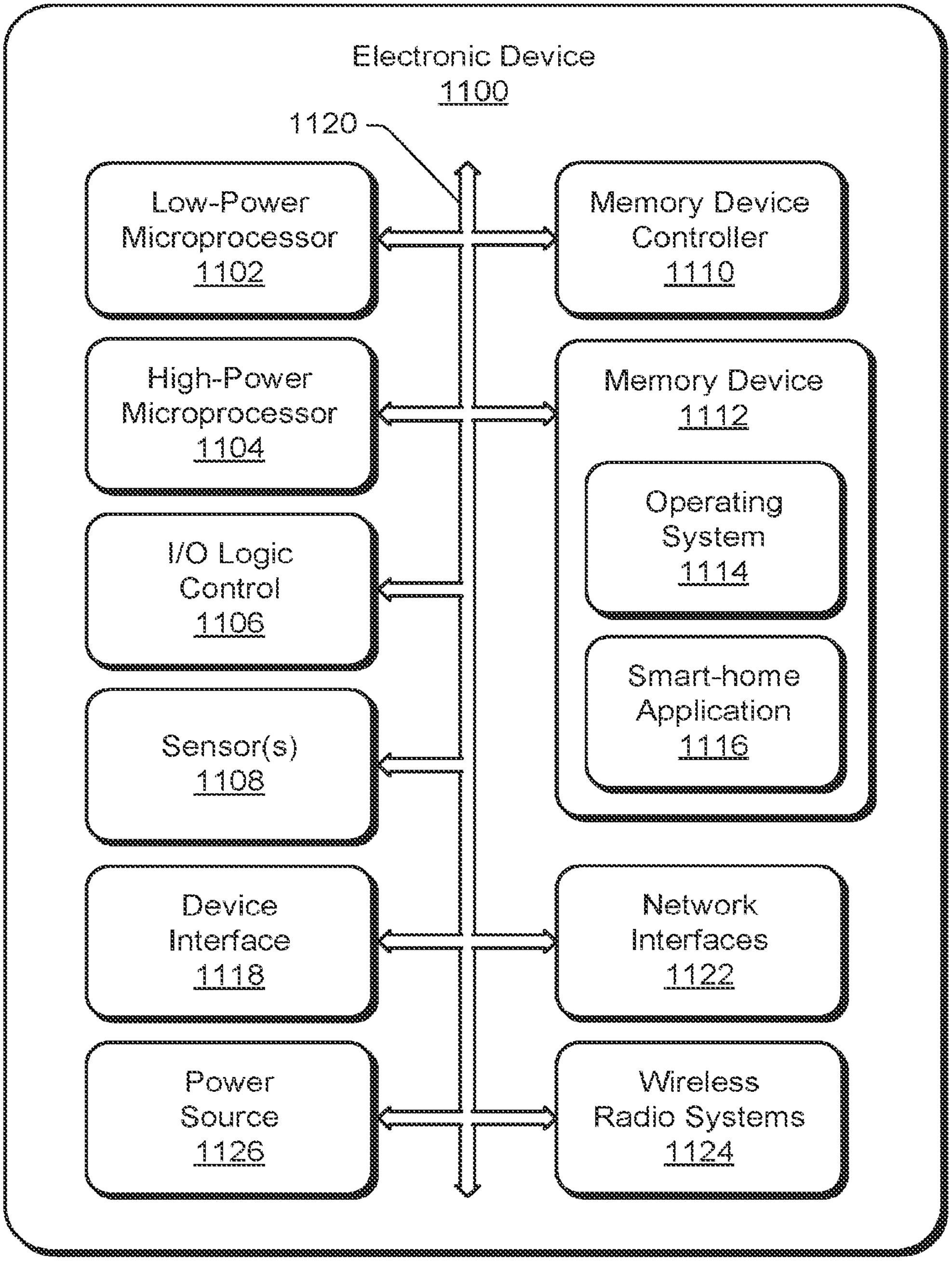
FIG. 11 is a block diagram illustrating an example electronic device that can be implemented as any electronic device that can connect to a wireless network, the electronic device including a multimode high-isolation antenna system in accordance with one or more aspects as described herein.

FIG. 11 is a block diagram illustrating an example electronic device 1100 that can be implemented as any electronic device that can connect to a wireless network, the electronic device including a multimode high-isolation antenna system in accordance with one or more aspects as described herein. The device 1100 can be integrated with electronic circuitry, microprocessors, memory, input output (I/O) logic control, communication interfaces and components, as well as other hardware, firmware, and/or software to communicate via the network. Further, the electronic device 1100 can be implemented with various components, such as with any number and combination of different components as further described with reference to the example device shown in FIG. 12.

In this example, the electronic device 1100 includes a low-power microprocessor 1102 and a high-power microprocessor 1104 (e.g., microcontrollers or digital signal processors) that process executable instructions. The device also includes an input-output (I/O) logic control 1106 (e.g., to include electronic circuitry). The microprocessors can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The low-power microprocessor 1102 and the high-power microprocessor 1104 can also support one or more different device functionalities of the device. For example, the high-power microprocessor 1104 may execute computationally intensive operations, whereas the low-power microprocessor 1102 may manage less-complex processes such as detecting a hazard or temperature from one or more sensors 1108. The low-power processor 1102 may also wake or initialize the high-power processor 1104 for computationally intensive processes.

The one or more sensors 1108 can be implemented to detect various properties such as acceleration, temperature, humidity, water, supplied power, proximity, external motion, device motion, sound signals, ultrasound signals, light signals, fire, smoke, carbon monoxide, global-positioning-satellite (GPS) signals, radio-frequency (RF), other electromagnetic signals or fields, or the like. As such, the sensors 1108 may include any one or a combination of temperature sensors, humidity sensors, hazard-related sensors, security sensors, other environmental sensors, accelerometers, microphones, optical sensors up to and including cameras (e.g., charged coupled-device or video cameras), active or passive radiation sensors, GPS receivers, and radio-frequency identification detectors. In implementations, the electronic device 1100 may include one or more primary sensors, as well as one or more secondary sensors, such as primary sensors that sense data central to the core operation of the device (e.g., sensing a temperature in a thermostat or sensing smoke in a smoke detector), while the secondary sensors may sense other types of data (e.g., motion, light, or sound), which can be used for energy-efficiency objectives or smart-operation objectives.

The electronic device 1100 includes a memory device controller 1110 and a memory device 1112, such as any type of a nonvolatile memory and/or other suitable electronic data storage device. The electronic device 1100 can also include various firmware and/or software, such as an operating system 1114 that is maintained as computer executable instructions by the memory and executed by a microprocessor. The device software may also include a smart-home application 1116 that implements aspects of the access point device. The electronic device 1100 also includes a device interface 1118 to interface with another device or peripheral component, and includes an integrated data bus 1120 that couples the various components of the electronic device for data communication between the components. The data bus in the electronic device may also be implemented as any one or a combination of different bus structures and/or bus architectures.

The device interface 1118 may receive input from a user and/or provide information to the user (e.g., as a user interface), and a received input can be used to determine a setting. The device interface 1118 may also include mechanical or virtual components that respond to a user input. For example, the user can mechanically move a sliding or rotatable component, or the motion along a touchpad may be detected, and such motions may correspond to a setting adjustment of the device. Physical and virtual movable user-interface components can allow the user to set a setting along a portion of an apparent continuum. The device interface 1118 may also receive inputs from any number of peripherals, such as buttons, a keypad, a switch, a microphone, and an imager (e.g., a camera device).

The electronic device 1100 can include network interfaces 1122, such as a network interface for communication with other electronic devices on the network, and an external network interface for network communication, such as via the Internet. The electronic device 1100 also includes wireless radio systems 1124 for wireless communication with other electronic devices via the network interface and for multiple, different wireless communications systems. The wireless radio systems 1124 may include Wi-Fi, Bluetooth™, Mobile Broadband, Bluetooth Low Energy (BLE), and/or point-to-point IEEE 802.15.4. Each of the different radio systems can include a radio device, antenna, and chipset that is implemented for a particular wireless communications technology. The electronic device 1100 also includes a power source 1126, such as a battery and/or to connect the device to line voltage. An alternating current (AC) power source may also be used to charge the battery of the device.

Figure 12:
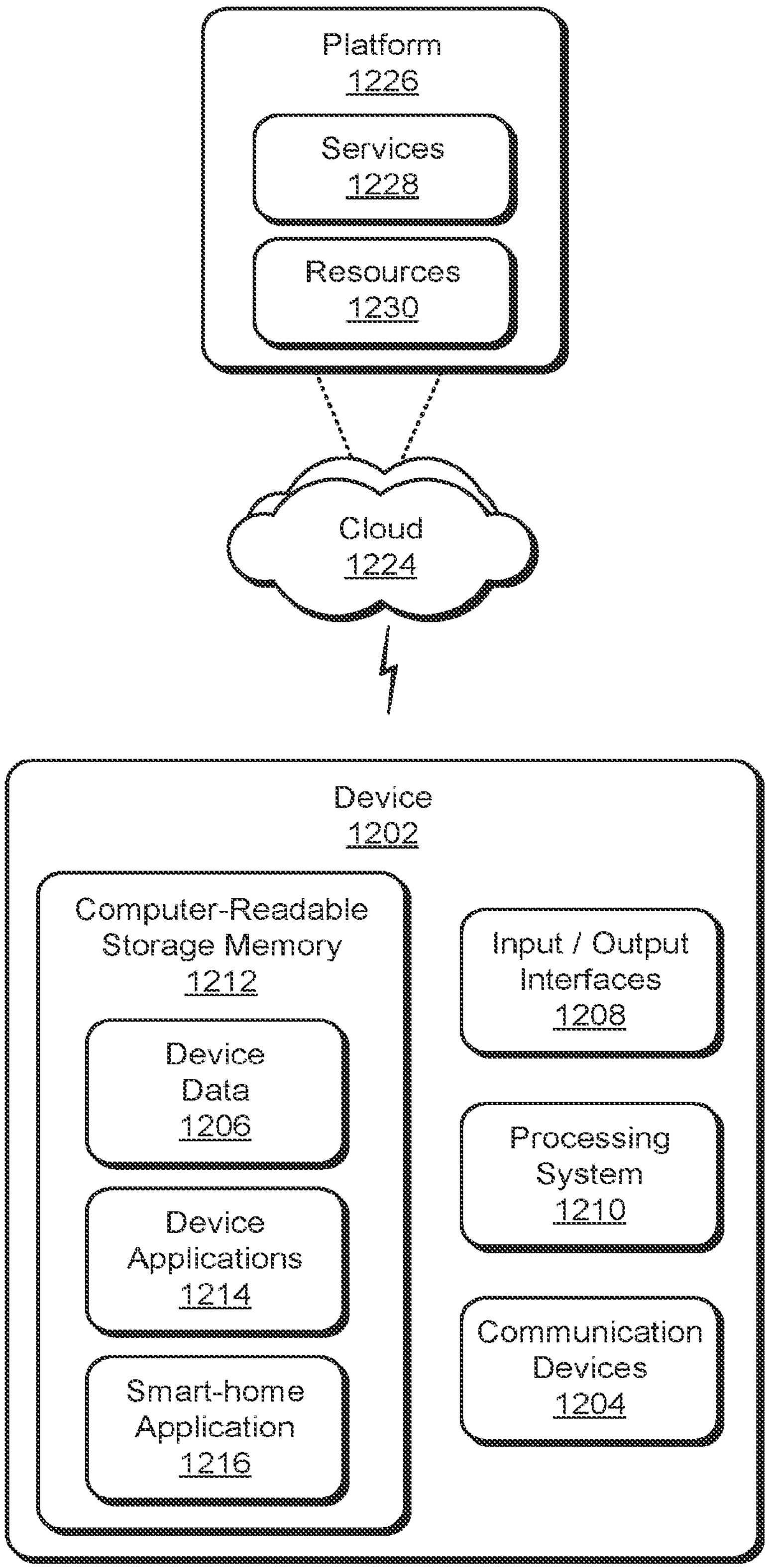
FIG. 12 is a block diagram illustrating an example system that includes an example device, which can be implemented as any electronic device that implements aspects of the multimode high-isolation antenna system 102 as described with reference to the previous FIGS. 1-11.

FIG. 12 is a block diagram illustrating an example system 1200 that includes an example device 1202, which can be implemented as any electronic device that implements aspects of the multimode high-isolation antenna system 102 as described with reference to the previous FIGS. 1-11. The example device 1202 may be any type of computing device, client device, mobile phone, tablet, communication, entertainment, gaming, media playback, and/or other type of device. Further, the example device 1202 may be implemented as any other type of electronic device that is configured for communication on a network, such as a thermostat, hazard detector, camera, light unit, commissioning device, router, border router, joiner router, joining device, end device, leader, access point, a hub, and/or other electronic devices.

The device 1202 includes communication devices 1204 that enable wired and/or wireless communication of device data 1206, such as data that is communicated between the devices in a network, data that is being received, data scheduled for broadcast, data packets of the data, data that is synched between the devices, etc. The device data can include any type of communication data, as well as audio, video, and/or image data that is generated by applications executing on the device. The communication devices 1204 can also include transceivers for cellular phone communication and/or for network data communication.

The device 1202 also includes input/output (I/O) interfaces 1208, such as data network interfaces that provide connection and/or communication links between the device, data networks (e.g., an internal network, external network, etc.), and other devices. The I/O interfaces can be used to couple the device to any type of components, peripherals, and/or accessory devices. The I/O interfaces also include data input ports via which any type of data, media content, and/or inputs can be received, such as user inputs to the device, as well as any type of communication data, such as audio, video, and/or image data received from any content and/or data source.

The device 1202 includes a processing system 1210 that may be implemented at least partially in hardware, such as with any type of microprocessors, controllers, or the like that process executable instructions. The processing system can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 1202 may further include any type of a system bus or other data and command transfer system that couples the various components within the device. A system bus can include any one or combination of different bus structures and architectures, as well as control and data lines.

The device 1202 also includes computer-readable storage memory 1212, such as data storage devices that can be accessed by a computing device, and that provide persistent storage of data and executable instructions (e.g., software applications, modules, programs, functions, or the like). The computer-readable storage memory described herein excludes propagating signals. Examples of computer-readable storage memory include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage memory in various memory device configurations.

The computer-readable storage memory 1212 provides storage of the device data 1206 and various device applications 1214, such as an operating system that is maintained as a software application with the computer-readable storage memory and executed by the processing system 1210. The device applications may also include a device manager, such as any form of a control application, software application, signal processing and control module, code that is native to a particular device, a hardware abstraction layer for a particular device, and so on. In this example, the device applications also include a smart-home application 1216 that implements aspects of the access point device, such as when the example device 1202 is implemented as any of the electronic devices described herein.

In aspects, at least part of the techniques described for the multimode high-isolation antenna system may be implemented in a distributed system, such as over a "cloud" 1224 in a platform 1226. The cloud 1224 includes and/or is representative of the platform 1226 for services 1228 and/or resources 1230.

The platform 1226 abstracts underlying functionality of hardware, such as server devices (e.g., included in the services 1228) and/or software resources (e.g., included as the resources 1230), and communicatively connects the example device 1202 with other devices, servers, etc. The resources 1230 may also include applications and/or data that can be utilized while computer processing is executed on servers that are remote from the example device 1202. Additionally, the services 1228 and/or the resources 1230 may facilitate subscriber network services, such as over the Internet, a cellular network, or Wi-Fi network. The platform 1226 may also serve to abstract and scale resources to service a demand for the resources 1230 that are implemented via the platform, such as in an interconnected device embodiment with functionality distributed throughout the system 1200. For example, the functionality may be implemented in part at the example device 1202 as well as via the platform 1226 that abstracts the functionality of the cloud 1224.

Further to the descriptions above, a user (e.g., guest or host) may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

In the following some examples are given.

Example 1: A multimode antenna system comprising: a generally-circular printed circuit board; a first antenna connected to the printed circuit board; a second antenna connected to the printed circuit board, the second antenna being approximately 90 degrees out of phase from the first antenna; and a decoupling structure connected to the printed circuit board at a location between the first antenna and the second antenna.

Example 2: The multimode antenna system of example 1, wherein at least one of the first antenna or the second antenna comprises: an inverted-F antenna; a first loop structure substantially aligned with the inverted-F antenna; and a second loop structure positioned adjacent to the inverted-F antenna, the second loop structure and the inverted-F antenna sharing a connection point to the printed circuit board.

Example 3: The multimode antenna system of example 2, wherein the inverted-F antenna comprises: a post connected to the printed circuit board and extending radially outward from the printed circuit board; and an arm having an arc that is concentric with the printed circuit board.

Example 4: The multimode antenna system of example 3, wherein the first loop structure is positioned between the printed circuit board and the arm of the inverted-F antenna.

Example 5: The multimode antenna system of example 3 or 4, wherein the arm of the inverted-F antenna has a length within a range of approximately 16 millimeters to approximately 18 millimeters.

Example 6: The multimode antenna system of any one of examples 2 to 5, wherein the second loop structure comprises: an additional post connected to the printed circuit board and extending radially outward from the printed circuit board; and a crossbeam connected to the post of the inverted-F antenna and having an arc that is concentric with the printed circuit board.

Example 7: The multimode antenna system of any one of examples 2 to 6, wherein the inverted-F antenna has an arm with an open end that is positioned within a range of approximately 4 millimeters to approximately 6 millimeters distal from the printed circuit board.

Example 8: The multimode antenna system of any one of examples 2 to 7, wherein the decoupling structure comprises a T-element with a center post and two arms that are substantially coplanar with the printed circuit board.

Example 9: The multimode antenna system of example 8, wherein one of the two arms of the T-element radially overlaps a portion of the second loop structure.

Example 10: The multimode antenna system of example 8 or 9, wherein each arm of the T-element has a length within a range of approximately 12 millimeters to approximately 14 millimeters.

Example 11: The multimode antenna system of any one of the preceding examples, wherein: at least one of the first antenna or the second antenna comprises: an inverted-F antenna operable as a quarter-wavelength monopole at a first low-band frequency and a three-quarter-wavelength monopole at a first high-band frequency; a first loop structure operable as a half-wavelength folded monopole at a second high-band frequency; and a second loop structure operable as a half-wavelength folded monopole at a third high-band frequency.

Example 12: The multimode antenna system of example 11, wherein the decoupling structure comprises a T-element operable as a quarter-wavelength monopole at a second low-band frequency in combination with the inverted-F structure operating as the quarter-wavelength monopole at the second low-band frequency.

Example 13: The multimode antenna system of example 11 or 12, further comprising: a touch sensor positioned proximate to the at least one of the first and second antennas, the touch sensor operable to conduct current while the first loop structure operates as the half-wavelength folded monopole at the first high-band frequency.

Example 14: The multimode antenna system of any one of examples 11 to 13, wherein: the first low-band frequency is approximately 2.4 GHz; the second low-band frequency is approximately 2.73 GHz; the first high-band frequency is approximately 5.85 GHz; the second high-band frequency is approximately 5.15 GHz; and the third high-band frequency is approximately 7.6 GHz.

Example 15: The multimode antenna system of any one of the preceding examples, wherein the printed circuit board is coplanar with each of the first antenna, the second antenna, and the decoupling structure.

Example 16: The multimode antenna system of any one of the preceding examples, wherein the decoupling structure is approximately 45 degrees out of phase with each of the first and second antennas.

Example 17: The multimode antenna system of any one of the preceding examples, wherein the first and second antennas in combination with the decoupling structure are operable in multiple resonant modes between approximately 2 GHz and approximately 8 GHz.

Example 18: An electronic device including a multimode antenna system of any one of the preceding examples.

CONCLUSION

Although aspects of the multimode high-isolation antenna system have been described in language specific to features and/or methods, the subject of the appended claims is not necessarily limited to the specific features or methods described. Rather, the specific features and methods are disclosed as example implementations of the claimed multimode antenna system or a corresponding electronic device, and other equivalent features and methods are intended to be within the scope of the appended claims. Further, various different aspects are described, and it is to be appreciated that each described aspect can be implemented independently or in connection with one or more other described aspects.

What is claimed is:

1. An antenna system comprising:

a first antenna connected to a printed circuit board;

a second antenna connected to the printed circuit board, the second antenna being approximately 90 degrees out of phase from the first antenna; and a decoupling structure connected to the printed circuit board at a location between the first antenna and the second antenna, wherein the printed circuit board is coplanar with each of the first antenna, the second antenna, and the decoupling structure.

2. The antenna system of claim 1, wherein at least one of the first antenna or the second antenna comprises:

an inverted-F antenna;

a first loop structure substantially aligned with the inverted-F antenna; and a second loop structure positioned adjacent to the inverted-F antenna, the second loop structure and the inverted-F antenna sharing a connection point to the printed circuit board.

3. The antenna system of claim 2, wherein the inverted-F antenna comprises:

a post connected to the printed circuit board and extending radially outward from the printed circuit board; and an arm having an arc that is concentric with the printed circuit board.

4. The antenna system of claim 3, wherein the first loop structure is positioned between the printed circuit board and the arm of the inverted-F antenna.

5. The antenna system of claim 3, wherein the arm of the inverted-F antenna has a length within a range of 16 millimeters to 18 millimeters, inclusive.

6. The antenna system of claim 3, wherein the second loop structure comprises:

an additional post connected to the printed circuit board and extending radially outward from the printed circuit board; and a crossbeam connected to the post of the inverted-F antenna and having an arc that is concentric with the printed circuit board.

7. The antenna system of claim 2, wherein the inverted-F antenna has an arm with an open end that is positioned within a range of 4 millimeters to 6 millimeters, inclusive, distal from the printed circuit board.

8. The antenna system of claim 2, wherein the decoupling structure comprises a T-element with a center post and two arms that are substantially coplanar with the printed circuit board.

9. The antenna system of claim 8, wherein one of the two arms of the T-element radially overlaps a portion of the second loop structure.

10. The antenna system of claim 1, wherein at least one of the first antenna or the second antenna comprises:

an inverted-F antenna operable as a quarter-wavelength monopole at a first low-band frequency and a three-quarter-wavelength monopole at a first high-band frequency;

a first loop structure operable as a half-wavelength folded monopole at a second high-band frequency; and a second loop structure operable as a half-wavelength folded monopole at a third high-band frequency.

11. The antenna system of claim 10, further comprising:

a touch sensor that is positioned proximate to the at least one of the first and second antennas, the touch sensor operable to conduct current while the first loop structure operates as the half-wavelength folded monopole at the first high-band frequency.

12. The antenna system of claim 10, wherein the decoupling structure comprises a T-element operable as a quarter-wavelength monopole at a second low-band frequency in combination with the inverted-F antenna structure operating as the quarter-wavelength monopole at the second low-band frequency.

13. The antenna system of claim 12, wherein:

the first low-band frequency is approximately 2.4 GHz;

the second low-band frequency is approximately 2.73 GHZ;

the first high-band frequency is approximately 5.85 GHz;

the second high-band frequency is approximately 5.15 GHz; and the third high-band frequency is approximately 7.6 GHz.

14. An antenna system comprising:

a first antenna connected to a printed circuit board;

a second antenna connected to the printed circuit board, the second antenna being approximately 90 degrees out of phase from the first antenna; and a decoupling structure connected to the printed circuit board at a location between the first antenna and the second antenna, wherein the decoupling structure is approximately 45 degrees out of phase with each of the first and second antennas.

15. The antenna system of claim 1, wherein the first and second antennas in combination with the decoupling structure are operable in multiple resonant modes between approximately 2 GHz and approximately 8 GHz.

16. An electronic device comprising:

a printed circuit board (PCB);

a first antenna connected to the PCB;

a second antenna connected to the PCB, the first antenna being approximately ninety degrees out of phase from the second antenna; and a decoupling structure positioned between the first antenna and the second antenna, wherein the decoupling structure comprises a T-shaped element with a center post and two arms that are substantially coplanar with the PCB.

17. The electronic device of claim 16, wherein:

each of the first antenna and the second antenna comprise:

an inverted-F antenna;

a first loop structure positioned between the inverted-F antenna and the PCB; and a second loop structure positioned proximate to the inverted-F antenna, the second loop structure and the inverted-F antenna sharing a connection point to the PCB.

18. The electronic device of claim 17, wherein one of the two arms of the T-shaped element radially overlaps a portion of the second loop structure.

19. The electronic device of claim 16, wherein the decoupling structure is approximately 45 degrees out of phase with each of the first antenna and the second antenna.

* * * * *